United States Patent [19]

Virdee et al.

[11] Patent Number: 5,768,278
[45] Date of Patent: Jun. 16, 1998

[54] N: 1 TRANSCODER

[75] Inventors: Harbhajan S. Virdee, Richardson; Mike M. Tatachar, Allen; Michael H. Jette, Grapevine, all of Tex.

[73] Assignee: DSC Communications Corporation, Plano, Tex.

[21] Appl. No.: 597,175

[22] Filed: Feb. 6, 1996

[51] Int. Cl.$^6$ .................................................. H04J 3/00
[52] U.S. Cl. .................................................. 370/468; 370/537
[58] Field of Search .................................................. 370/464, 465, 370/468, 470, 471, 472, 474, 477, 478, 433, 435, 357, 351, 360, 494, 495, 286, 521, 522, 527, 537, 538; 386/46, 109, 112; 364/514 A, 514 R; 375/240, 241; 395/2.91, 29.4

[56] References Cited

U.S. PATENT DOCUMENTS

| | | | |
|---|---|---|---|
| 4,897,832 | 1/1990 | Suzuki et al. | 370/287 |
| 5,065,395 | 11/1991 | Shenoi et al. | 370/435 |
| 5,280,532 | 1/1994 | Shenoi et al. | 370/474 |
| 5,357,516 | 10/1994 | Klingberg | 370/477 |
| 5,467,372 | 11/1995 | Nishitani | 375/244 |
| 5,526,397 | 6/1996 | Lohman | 379/58 |
| 5,553,079 | 9/1996 | Niki et al. | 370/478 |

OTHER PUBLICATIONS

Hodges, et al., "Development and Testing of DCME Systems," British Telecommunications Engineering, Part 3, pp. 205–212, Oct. 11, 1992.

Kato, et al., "DCME System NCM-501," NEC Research & Development, No. 3, pp. 389–399, Jul. 1991.

Kessler, Edward A., "Digital Circuit Mulitiplication Equipment and Systems—An Overview," British Telecommunications Engineering, pp. 106–111, Jul. 11, 1992.

International Telecommunication Union, "Gerneral Aspects of Digital Transmission Systems; Terminal Equipments; Physical/Electrical Characteristics of Hierarchical Digital Interfaces," CCITT, G.703, Geneva 1991, pp. 1–39.

International Telecommunication Union, "General Aspects of Digital Transmission Systems; Terminal Equipments; Synchronous Frame Structures Used at Primary and Secondary Hierarchical Levels," CCIT, G.704, Geneva 1991, pp. 1–33.

*Primary Examiner*—Alpus H. Hsu
*Assistant Examiner*—Kwang Bin Yao
*Attorney, Agent, or Firm*—Baker & Botts, L.L.P.

[57] ABSTRACT

An N:1 transcoder (12, 40) with a compression data path that includes uncompressed digroup circuits (92, 94, 96, 98, and 100) each receiving N incoming uncompressed signal and extracting a plurality of control, signaling, and voice/data traffic channels therefrom, a compressor (120) coupled to the uncompressed digroup circuits (92, 94, 96, 98, and 100) and compressing data in selected ones of the extracted voice/data channels, and a compressed data circuit (126) coupled to the compressor (120) for packing the compressed data into predetermined channels of one compressed signal, and further providing control, signaling, and performance monitoring information embedded therein.

39 Claims, 6 Drawing Sheets

N: 1 TRANSCODER

TECHNICAL FIELD OF THE INVENTION

This invention is related in general to the field of telecommunications systems. More particularly, the invention is related to an N:1 transcoder.

BACKGROUND OF THE INVENTION

In the early days of telecommunication, a copper wire medium was used to carry a single information channel. Because the greatest proportion of cost is in the materials and construction of the physical link, telephony engineers have developed ways to pack multiple channels onto a single physical link. Frequency division multiplexing (FDM) and time division multiplexing (TDM) have been devised to multiplex multiple streams of analog and pulse code modulation (PCM) digital signals, respectively, into one. For digital signals, the TDM hierarchy is DS0 through DS4, where a DS0 is a single 0.064 Mbits/sec channel and a DS4 is 4,032 message channels (DS0s) multiplexed together.

A similar TDM scheme is used in international telephone systems based on 32-channel format. The international digital systems, based on International Telecommunication Union CCITT's G.700 Series Recommendations, are commonly called E1 or CEPT-1. The E1 signals are based on blocks of 32 channels or time slots, of which time slot 0 and time slot 16 typically are used for control and signaling, respectively.

Although both the U.S. and international digital systems provide for the multiplexing of DS0 or E1 signals to form higher rate signals, greater efficiency of the physical telecommunications link is desired. The capability to transport a higher concentration of voice and data channels advantageously decreases the number of physical links and further lower the toll exacted for connecting the calls.

SUMMARY OF THE INVENTION

Accordingly, there is a need for a transcoder that concentrates multiple E1 signals onto one E1 link.

In accordance with the present invention, an N:1 transcoder is provided which eliminates or substantially reduces the disadvantages associated with prior systems.

In one aspect of the invention, an N:1 transcoder with a compression data path that includes an uncompressed digroup circuit receiving N incoming uncompressed signals and extracting a plurality of control, signaling, and voice/data traffic channels therefrom, a compressor coupled to the uncompressed digroup circuit and compressing data in selected ones of the extracted voice/data channels, and a compressed data circuit coupled to the compressor packing the compressed data into predetermined channels of one compressed signal, and further providing control, signaling, and performance monitoring information embedded therein.

In another aspect of the invention, four E1 signals are compressed by the transcoder of the present invention and packed into one compressed E1 signal.

In yet another aspect of the invention, the compressed E1 signal includes control, monitoring, and status information of channels in the four E1 signals embedded in predetermined channels of the compressed E1 signal.

BRIEF DESCRIPTION OF THE DRAWINGS

For a better understanding of the present invention, reference may be made to the accompanying drawings, in which.

DETAILED DESCRIPTION OF THE INVENTION

Figure 1:
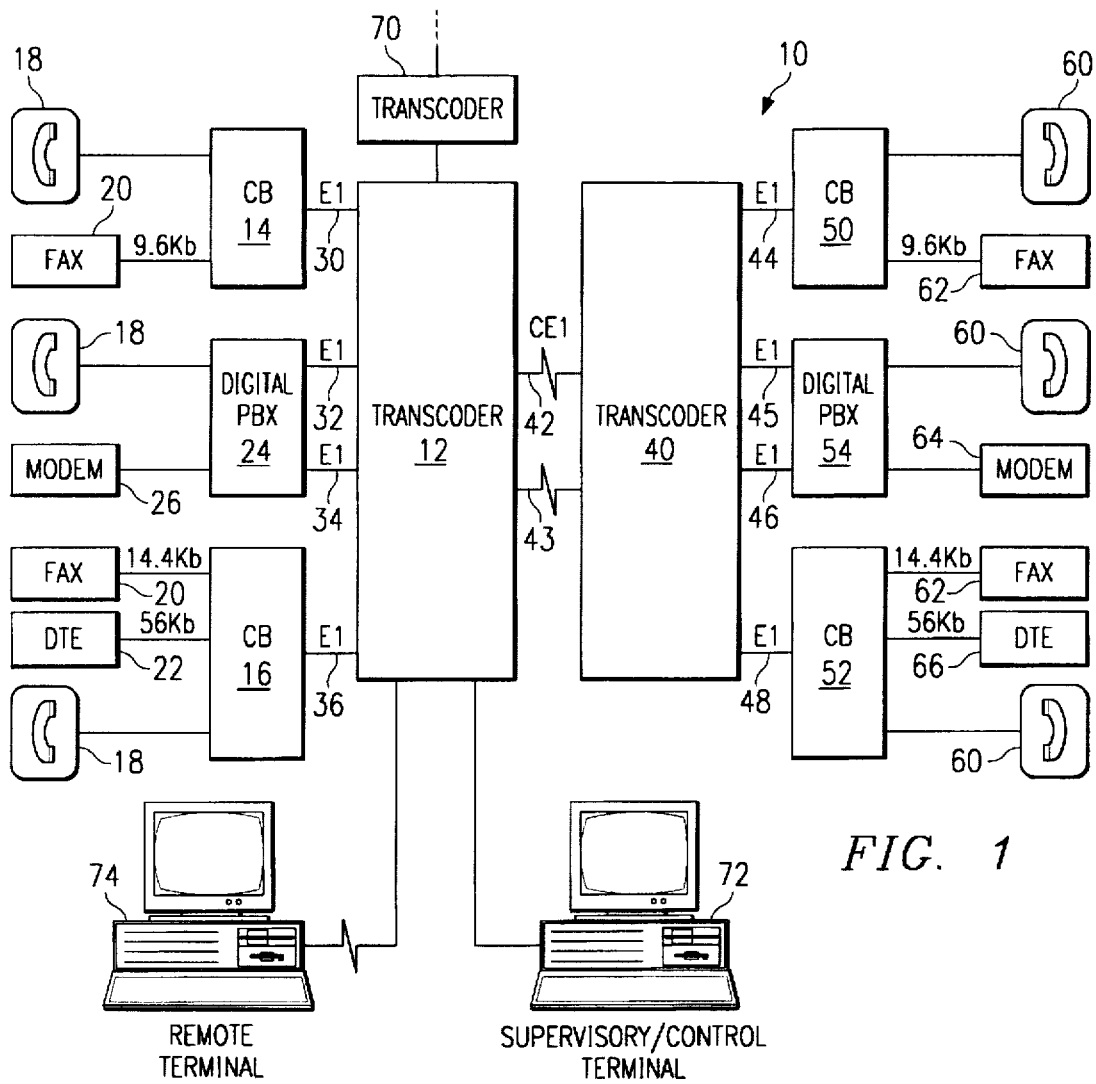
FIG. 1 is a simplified block diagram showing typical applications of transcoders constructed in accordance with the teachings of the present invention.

The preferred embodiment(s) of the present invention is (are) illustrated in FIGS. 1–8, like reference numerals being used to refer to like and corresponding parts of the various drawings.

Referring to FIG. 1, a typical telephony application 10 of a transcoder 12 of the present invention is shown. Transcoder 12 is coupled to channel banks (CB) 14 and 16, which digitize and multiplex multiple voice and data signals onto a single E1. The voice and data signals may originate from telephones 18, facsimile machines (FAX) 20, and data terminal equipment (DTE) 22. Transcoder 12 may be also coupled to digital private branch exchanges(PBX) 24, which may be coupled to telecommunications equipment including telephones 18 and modems 26. Channel banks 14 and 16 and digital private exchange 24 are coupled to transcoder 12 via E1 links 30–36, each transporting data and voice channels in E1 format.

Transcoder 12 compresses the four E1 signals on links 30–36 into a single E1. Transcoder 12 is coupled to a remote transcoder 40 using a single E1 link 42 to transport the compressed E1 (CE1). E1 link 42 may be any transmission medium, including copper, optical, and wireless. A redundant link 43 is also provided in case of link 42 failure. Remote transcoder 40 decompresses the compressed E1 into four E1 signals and provides them on E1 links 44–48 to channel banks 50 and 52, and digital private branch exchange 54, which are coupled to telecommunications equipment including telephones 60, facsimile machines 62, modems 64, and data terminal equipment 66.

In a similar manner, voice and data may be compressed by remote transcoder 40 onto E1 link 42, and decompressed by transcoder 12 into the respective E1 signals.

Multiple transcoders 70 may be coupled to transcoder 12 in a daisy-chain fashion, for example, via RS-232 links, to communicate control and/or alarm information, for example. A supervisory/control terminal 72 may be coupled to transcoder 12. Entry of programming parameters and control of transcoders 12 and 40 may be performed on supervisory/control terminal 72. Monitoring and control of remote transcoder 40 may be performed by transporting monitoring and control information to and from remote transcoder 40 using bandwidth in the compressed E1. Monitoring and control of transcoders 12 and 40 may also be performed via a remote terminal 74 coupled to transcoder 12. In this manner, craft personnel may access transcoder 12 and/or transcoder 40 by dialing up through remote terminal 74.

Figure 2:
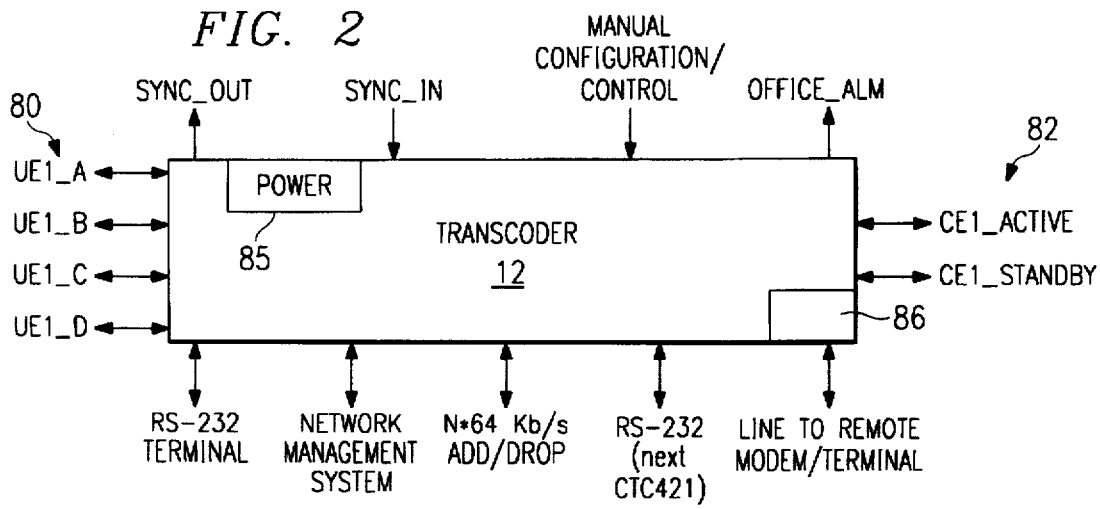
FIG. 2 is a block diagram showing input and output to a transcoder constructed according to the teachings of the present invention.

FIG. 2 shows the important input and output signals of transcoder 12. N bidirectional uncompressed E1 signals (shown as UE1_A, UE1_B, UE1_C, and UE1_D) are received by or provided by transcoder 12. Two bidirectional compressed E1 signals CE_ACTIVE and CE_STANDBY are also received by or provided by transcoder 12. Compressed E1 signals CE_ACTIVE and CE_STANDBY are redundant signals provided as backups of one another. A DC or AC power supply and its backup supply 85 are included to provide power and backup power to transcoder 12.

SYNC_IN is an external reference clock signal, which may be used to generate a system synchronization clock signal. The generated system synchronization clock signal may be provided as a SYNC_OUT clock signal to other co-located transcoders 70 (FIG. 1) daisy-chained with transcoder 12 so that synchronization may be achieved with a single timing source.

OFFICE_ALM is an output signal generated by transcoder 12 to indicate alarm conditions.

As indicated above, transcoder 12 operations may be monitored and controlled via a local terminal or a remote terminal through a modem connection 86. A RS-232 link is also shown for connection to daisy-chained co-located transcoder(s).

Additional control inputs to transcoder 12 may include manually configurable selection/switches located on a front panel (FIG. 3), and a network management system (NMS) control and configuration parameters. NMS is a serial link operating under Simple Network Management Protocol (SNMP) as known in the art. An N*64 kb/s add/drop link is further provided between the local transcoder and the remote transcoder.

Figure 3:
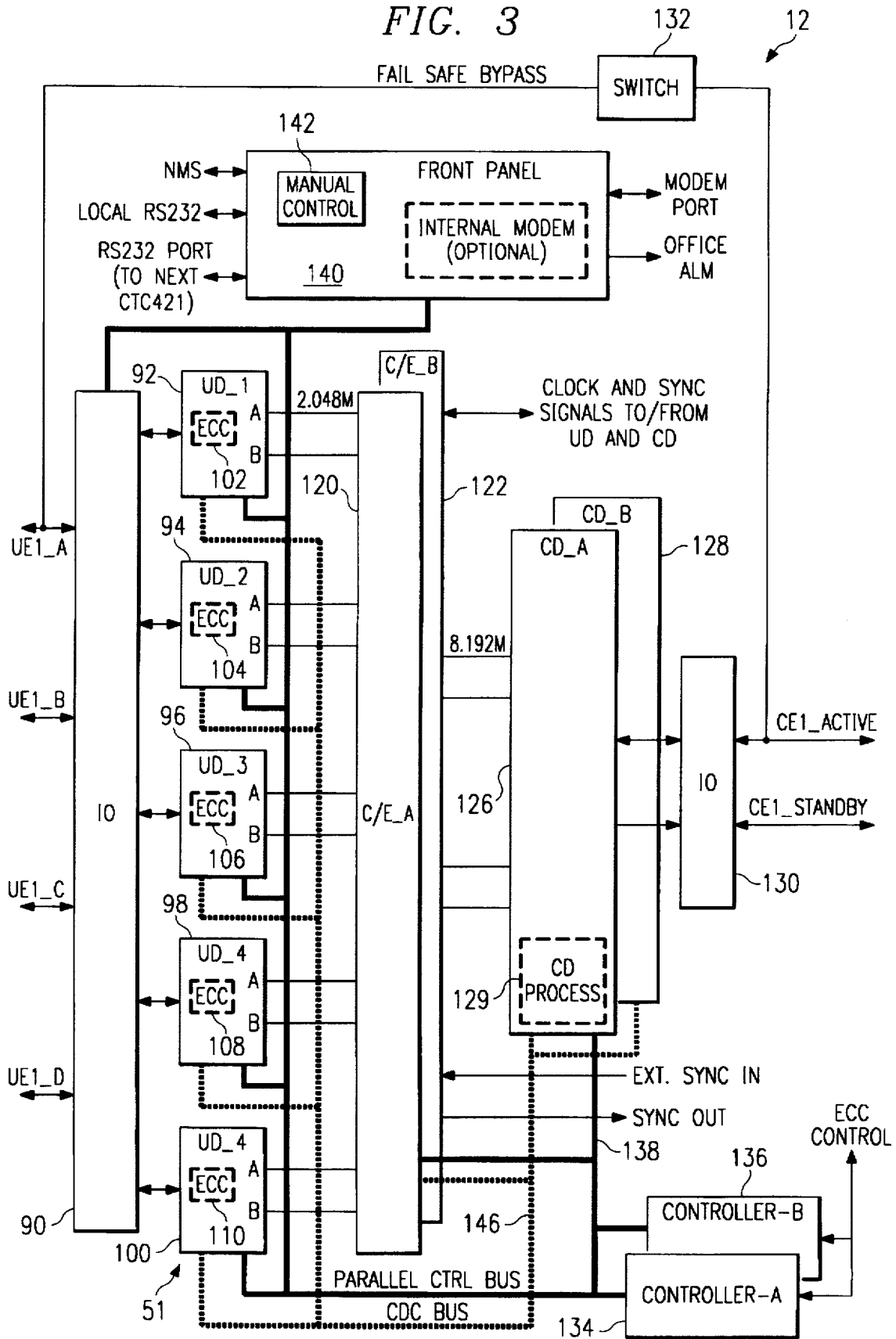
FIG. 3 is a block diagram of an embodiment of the transcoder.

FIG. 3 is a simplified functional block diagram of transcoder 12. Because the circuits perform different functions depending on whether a compression or decompression of E1 signals is being desired, FIG. 3 provides an overview of relevant circuits involved and FIGS. 4 and 5, described below, set forth a more detailed operational discussion of each circuit block.

Referring to FIG. 3, an input/output circuit (IO) 90 is used to provide physical connection to the incoming and outgoing E1 signals. Input/output circuit 90 may also provide functions such as impedance matching to satisfy any interface requirement. Input/output circuit 90 is coupled to uncompressed digroup circuits UD_1 through UD_4 92–98. A redundant uncompressed digroup circuit UD_R 100 is further coupled to input/output circuit 90, which may switch any of the incoming uncompressed E1 signals thereto in case of any equipment failure of UD_1 through UD_4 92–98. Uncompressed digroup circuits 92–100 may each include an echo-canceler circuit (ECC) 102–110. Uncompressed digroup circuits 92–100 are further coupled to a compress/ expand circuit C/E_A 120 and its redundant copy C/E_B 122. Compress/expand circuit 120 and 122 performs the compression or expansion function. One compress/expand circuit C/E_A or C/E_B 120 or 122 is designated as active and the other standby during normal operations. A failure of one immediately causes the standby operational circuit to be the active circuit.

A compressed data circuit CD_A 126 and its redundant copy CD_B 128 are coupled to compress/expand circuits 120 and 122. Compressed data circuits 126 and 128 either packs compressed data into available bandwidth in the compressed E1 signal or extracts embedded voice/data and control and signaling information from the compressed E1 signal. A CD processor 129 resides in compressed data circuit 126 and 128. CD processor 129 provides real-time traffic information every 16 ms, for example. CD processor 129 may also be instructed to insert a predetermined data pattern into specific channels of the E1 signals to verify circuit operations and to isolate faults in transcoder 12.

A second input/output circuit (IO) 130 provides physical connections for the outgoing or incoming compressed E1 signals CE_ACTIVE and CE_STANDBY. Input/output circuit 130 may also provide for line drivers and isolation functions.

In case of catastrophic failure, such as power loss, uncompressed E1 signal on UE_1A may be connected through a switch 132 directly to compressed E1 CE1_ACTIVE. Conditions that warrant such E1 signal bypass include the failure of both compressed data circuits CD_A and CD_B 126 and 128; the failure of both compress/expand circuits C/E_A and C/E_B 120 and 122; total power loss to transcoder 12 (including any redundant power supplies); and loss of sync detected by compressed data circuit 126 and 128 for a predetermined period of time. A predetermined number of E1 overhead bits are used to inform remote transcoder 40 of a bypass condition, so that remote transcoder 40 may recognize the transmitted E1 signal as an uncompressed E1 signal.

Controller circuits CONTROLLER_A and CONTROLLER_B 134 and 136 provide for the communication and control between all functional circuits via a control bus 138. Control bus 138 may include a data bus, address bus, and control lines. Controller circuits 134 and 136 may select a control and/or communication target by using the control lines and further select specific locations within the target circuit by using the address bus. A watchdog timer may be used to continually monitor the operation of controller circuits 134 and 136. If a failure is detected in one controller circuit, the watchdog timer times out and deactivates the currently active controller circuit and activating the redundant controller circuit. Controller circuits 134 and 136 also may communicate control parameters to echo cancelers (ECC) 102–110 via an additional bus. Controller circuits 134 and 136 further have access to a front panel 140, which may provide some visual alarm indicators, such as LEDs or an alphanumeric display, and RS232 connections to local and remote terminals as well as to any co-located transcoders. A manual control 142 may further provide a menu-driven input for a user to enter transcoder control and operational parameters.

A CDC bus 146 provides for the communication of signaling and overhead information between uncompressed digroup circuits 92–100 and compressed data circuits 126 and 128. Each uncompressed digroup circuit 92–100 sends an analysis of its incoming uncompressed E1 channels to compressed data circuit 126 and 128 to be used in the packing of the data from all incoming channels.

Figure 4:
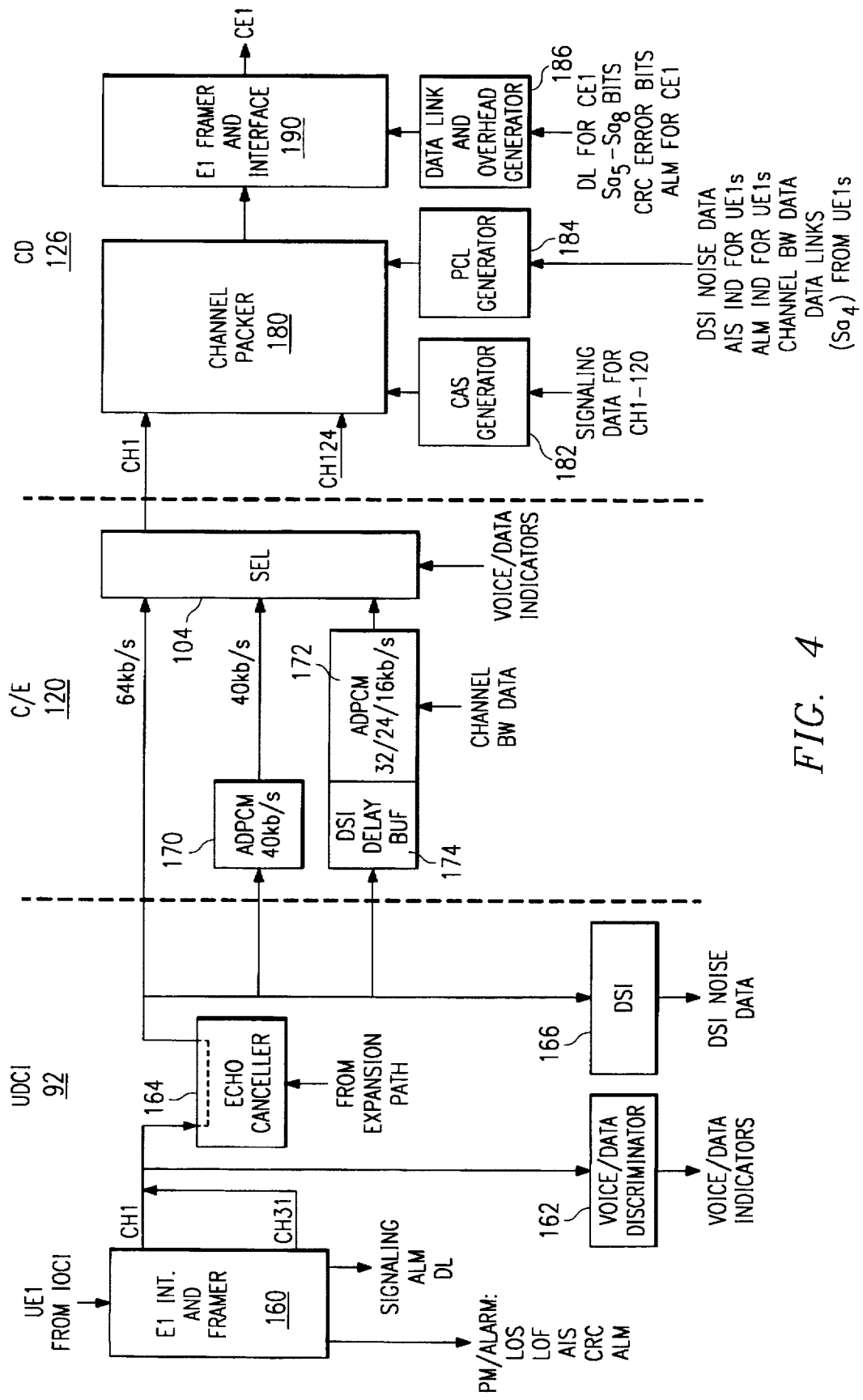
FIG. 4 is a block diagram showing a compression data path.

Referring to FIG. 4, a compression data path from an uncompressed digroup circuit 92 to compress/expand circuit 120 then to compressed data circuit 128 is shown. In this direction, four E1 data streams are compressed into a single E1 data stream, which is then transmitted to remote transcoder 40. Uncompressed digroup circuit 92 receives a standard E1 2.048 Mb signal that electrically conforms to International Telecommunication Union CCITT Recommendations G.703 *Physical/Electrical Characteristics of Hierarchical Digital Interfaces* and has the frame format of CCITT specifications G.704 *Synchronous Frame Structures Used at Primary and Secondary Hierarchical Levels*. According to ITU G.703 and G.704, an E1 signal has 32 time slots. Time slot 0 is assigned to carry framing and control information, and time slot 16 is assigned to transport common channel signaling (CCS) or channel associated signaling (CAS). The remaining time slots are used to carry subscriber bearer channels.

Uncompressed digroup circuit 92 includes an E1 interface and framer circuit 160 that converts the received E1 signal from bipolar to unipolar format, and extracts the 64 kb signals in time slots 1 through 32. If time slot 16 is configured for channel associate signaling, then the A, B (or A, B, C, D) signaling information is also extracted by further processing of channel 16. Performance and alarm condition monitoring on the E1 signal is also done and the results passed on to controller circuit 136 and 138 (FIG. 3). Uncompressed digroup circuit 92 also includes a discriminator 162 which analyzes each of the 31 channels for voice/data determination. The voice/data indication is used to further analyze the signal according to the type of activity.

An optional echo canceler 164 may be included to provide echo-canceling capability for the voice channels. Uncompressed digroup circuit 92 may be configured to operate with or without echo canceler 164. In speech channels, a determination is further made as to when there is "silence" so that digital speech interpolation (DSI) techniques may be applied by a DSI circuit 166. During the "silence" periods, the DSI algorithms determine the noise level on the line and the noise parameters are provided to compressed digroup circuit 92 for transmission for the eventual reconstruction of the "silence" at remote transcoder 40.

In case of voice-band data, a determination is made as to whether the data rate is greater than a certain rate, 9.6 kb for example. This information is relayed to compression/expansion circuit 120 (through controller 134) not to compress the data.

Uncompressed digroup circuit 92 also determines whether a channel contains high speed data, such as 56 kb or 64 kb, in which case a clear channel would be allocated on the compressed E1 for that incoming channel.

A multiplexed 2.048 Mb data stream containing the voice/data channels is provided from uncompressed digroup circuit 92 to compress/expand circuit 120. Controller 134 controls the operation of compress/expand circuit 120, which has the ability to compress 124 (31×4) channels from 64 kb to 40, 32, 24, or 16 kb using adaptive differential pulse code modulation (ADPCM) techniques compatible with CCITT G.721 and G.723. If the data rate is less than or equal to 9.6 kb then 40 kb ADPCM compression 170 is used to compress the signal. Speech signals are shown compressed in ADPCM functional block 172. A delay buffer 174 may be used to provide delay when DSI is used on the speech channels.

The level of compression is fixed for pre-assigned channels and is dynamic for channels set to AUTO. An eight bit PCM word from each channel is compressed into 5, 4, 3 or 2 bits as dictated by controller 134. For clear pass-through channels there is no compression and the 8 bit word is passed through compress/expand circuit 120 unaltered. Timing synchronization and clock selection/generation is also accomplished by compress/expand circuit 120.

The compressed channels from compress/expand circuit 120 are provided to compressed data circuit 128. A channel packer 180 picks up channels containing 16 kb or greater bandwidth and packs them in the available bandwidth. The signaling channels is generated by a generator 182. A proprietary communications link (PCL) generator 184 also constructs a PCL channel with information from uncompressed digroup circuit 92 and controller circuit 134. Finally, the proprietary data link (PDL), overhead channel, and time slot 0 are constructed by generator 186 and attached to the packed data. The binary signal is then converted to bipolar E1 by the interface and framer 190 for output. Details of the proprietary communications link and proprietary data link are set forth below.

Figure 5:
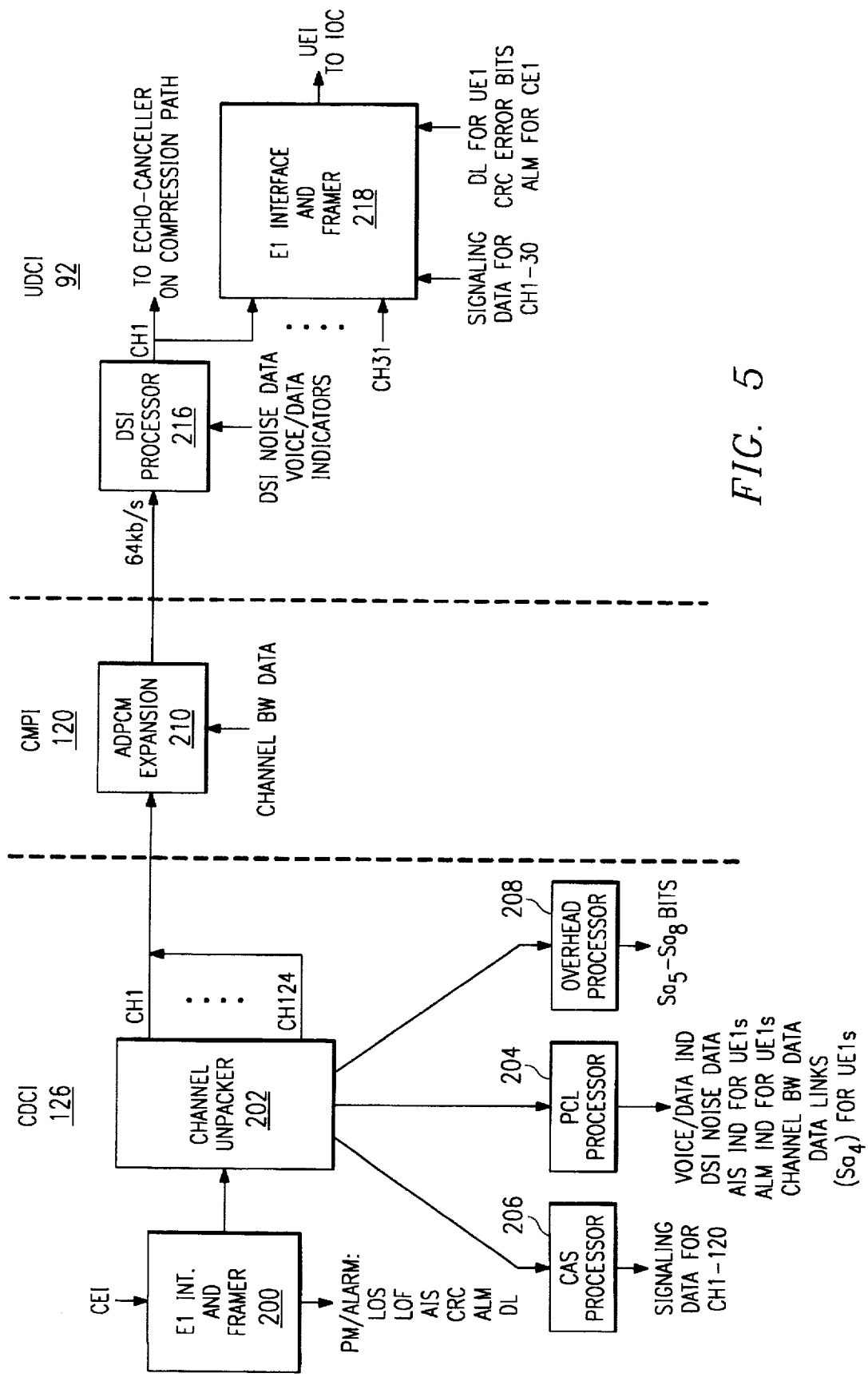
FIG. 5 is a block diagram showing a decompression data path.

FIG. 5 shows the expansion data path through the compressed data circuit 126, compress/expand circuit 120, and uncompressed digroup circuit 92. In this direction, a single compressed E1 is expanded into four separate E1 data streams which are then transmitted to standard E1 equipment such as D4 channel banks.

In the expansion direction, an interface and framer circuit 200 of compressed data circuit 126 interfaces to the incoming compressed E1 signal, converts it from bipolar to unipolar format, and further provides enhanced performance monitoring functions. After framing and overhead extraction, a channel unpacker 202 unpacks the channels and extracts the proprietary communications link (PCL) data. The proprietary communication link data is provided to a processor 204, which evaluates it. This data is used to configure transcoder 12 as well as provide the necessary overhead information ($Sa_4$ bits, RAI bit, Bandwidth, DSI noise parameters) to uncompressed digroup circuits 92 through CDC bus 146 (FIG. 3). If the proprietary communications link data indicates the presence of one or more signaling channel(s), then the channel(s) are also extracted and provided to a CAS processor 206 for processing, and the appropriate information/data are sent to uncompressed digroup circuit 92 through CDC bus 146. The extracted overhead is also provided to an overhead processor 208 for processing. Compressed data circuit 126 extracts the embedded 120 voice/data (or 124 in case of no signaling) channels from the incoming compressed E1 and passes them on to compress/expand circuit 120 to be decompressed. A multiplexed 8.192 Mb/s data stream links compressed data circuit 126 with compress/expand circuit 120 and contains the 120 or 124 voice/data channels.

Compress/expand circuit 120 includes an expansion circuit 210, which locates each of the voice/data channels within the 8.192 Mb/s data stream, and by using the bandwidth (BW) information provided by compressed data circuit 126, expands them from 2, 3, 4, 5, or 8 bits to 8 bits. Expansion circuit 210 further groups the 30 (or 31 when no signaling is used) groups of data into a multiplexed 2.048 Mb/s data stream and sends it to the appropriate uncompressed digroup circuit 92 (UD_1 through UD_4 or UD_R).

Uncompressed digroup circuit 128 locates each of the 64 kb channels within the received 2.048 Mb/s data stream from compress/expand circuit 120. For each channel, any required substitution of DSI noise is carried out by a DSI processor 216 using the noise parameters provided by compressed data circuit 126 via CDC bus 146. In the case of CAS signaling, channel 16 of the uncompressed E1 is constructed by an interface and framer circuit 218 from either a,b or a,b,c,d signaling as provided by compressed data circuit 126. Channel 0 (framing channel) is constructed from the overhead, including the $Sa_4$–$S_8$, ALM bits. The constructed and decompressed E1 signal is passed on to input output circuit 90 (FIG. 3).

Figure 6:
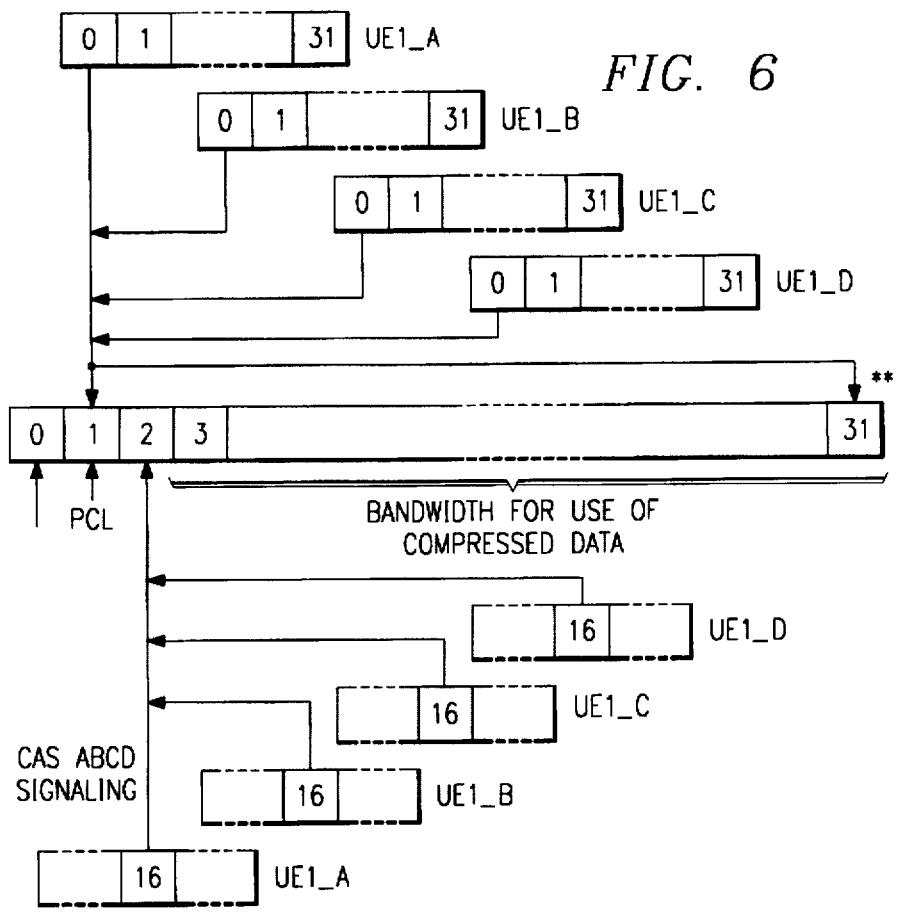
FIG. 6 is a diagram showing an exemplary bit mapping of four uncompressed E1 to one compressed E1.
Figure 7:
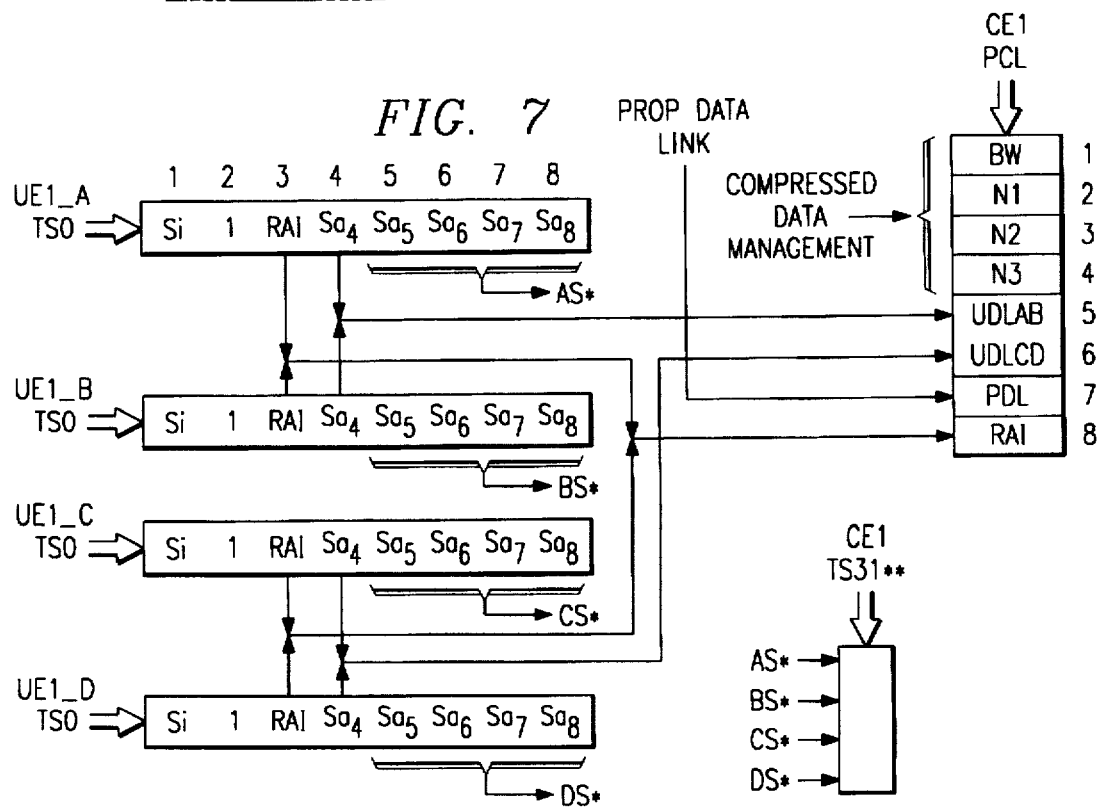
FIG. 7 is a diagram showing an exemplary bit mapping of control and overhead information of four uncompressed E1 to time slot(s) in compressed E1.
Figure 8:
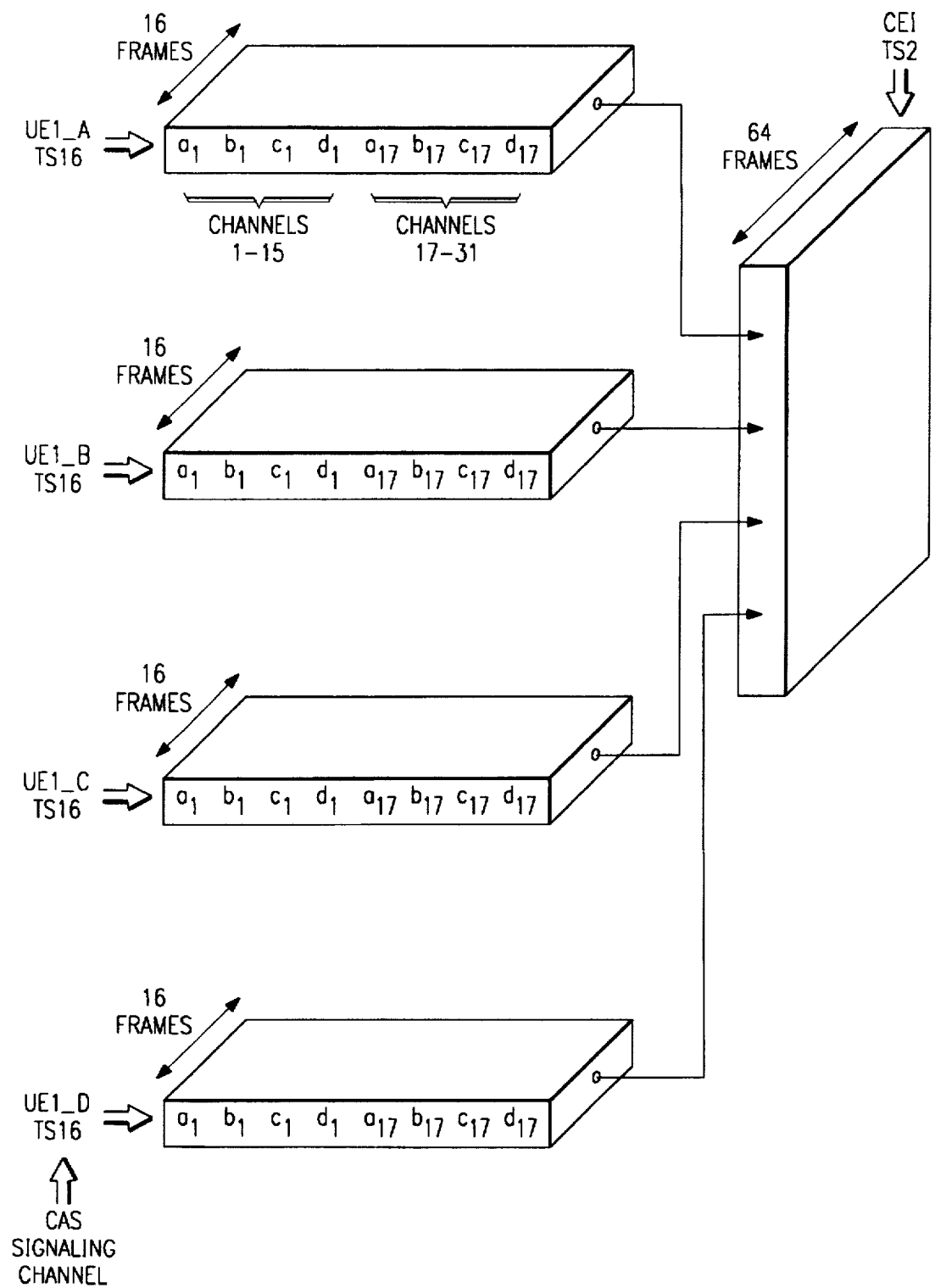
FIG. 8 is a diagram showing an exemplary bit mapping of channel associated signaling (CAS) information from four uncompressed E1 to time slot(s) in compressed E1.

The operations of transcoders 12 and 40 may be better understood by referring to FIGS. 6–8, which provides an exemplary mapping of control, signaling, and bearer channels between compressed and uncompressed E1. Fixed bandwidth is required to pass through E1 overhead from the uncompressed E1 lines and a proprietary communications link (PCL) is used to configure the remote receiving transcoder so that is has the necessary information to reconstruct each of the E1 links at the remote end. In addition, if signaling is to be transferred, then fixed bandwidth is also allocated for this purpose. There are two modes of signaling that are commonly used in E1 transmission systems: common channel signaling (CCS) and channel associated signaling (CAS). Either signaling mode can be accommodated. The construction of the compressed E1 signal depends on which of these signaling system is being used.

Referring to FIG. 6, an exemplary mapping of control, signaling and bearer channels is shown. It is worthwhile to note that while FIG. 6 shows specific time slots being used to carry certain signals, such designation is an example thereof, and the teachings of the present invention are not limited to the specific mapping shown therein. In each E1 signal frame, there are a total of 32 time slots, numbered TS0 through TS31, where each time slot has a bandwidth of 64 kb/s. Alternate frames of time slot 0 (TS0) are always used for framing and overhead information. Time slot 0 of the compressed E1 signal is used to carry a frame alignment signal and other control information such as cyclic redundancy checking (CRC), remote alarm indicator (RAI), and $Sa_{4-8}$ bits. The format of time slot 0 is the same as that of standard E1.

As shown in FIG. 6, selected information from time slots 0 of uncompressed E1 signals, UE1_A through UE1_D, may be mapped to a proprietary communications link (PCL) of compressed E1, CE1_ACTIVE and CE1_STANDBY, which may occupy time slot 1. The proprietary communications link provides end-to-end configuration, control, and monitoring functions, which includes remote alarm indicator, bandwidth, DSI noise parameters, and a proprietary data link (PDL) bit for high speed alarm and diagnostic reporting to the remote transcoder. Certain overhead bits, including $Sa_{5-8}$, may be optionally included in time slot 31 or the last time slot in a factional E1 application. Signaling in time slot 16 of uncompressed E1 is further mapped to time slot 2 of compressed E1, for example. Time slots 3–31 are used to carry compressed data from the four uncompressed E1 signals.

Referring to FIG. 7, a more detailed exemplary mapping of time slots 0 of uncompressed E1 signals into the proprietary communications link of the compressed E1 signal is shown. Proprietary communications link is configured in a multiple-frame format, where a certain number of frames carry channel bandwidth information (BW), idle noise parameters for DSI (N1–N3), the $Sa_4$ bits (the data link bit) of uncompressed E1 signals, remote alarm indicator (RAI), and a proprietary data link (PDL) bit used for high speed alarms/status/control purposes. PDL may have a multi-frame structure carrying signaling information, software download control and status, and operational control, alarm and status of various circuit components. Because the $Sa_4$ bit may be used as a message-based data link used for operations, maintenance and performance monitoring, as recommended by CCITT, end-to-end transparency of this bit is provided. When the Sa4 bits in the uncompressed E1s are not required to be transferred then this bandwidth can be used for other purposes. Similarly, RAI end-to-end transparency is also provided. Certain frames of the proprietary communications link may be used to convey performance information about each uncompressed E1 to the remote transcoder. As shown, $Sa_{4-8}$ bits of uncompressed E1s may also be optionally carried in time slot 31 or the last time slot used in a factional E1 application if end-to-end transparency is desired.

FIG. 8 shows an exemplary mapping of channel associated signaling to compressed E1. In E1, a 16-frame structure of time slot 16 is used for channel associated signaling. Signaling of the four uncompressed E1s is mapped to a time slot, for example time slot 2, of compressed E1. The chosen time slot in a 32-frame format is used to support signaling (a,b) for all the 120 (30×4) incoming uncompressed E1 channels with a signaling update every 4 ms. If it is necessary to transfer more than two signaling bits, such as a, b, c, and d per channel, then the update rate is 8 ms with a 64-frame format.

In the worse case when channel associated signaling is used, 28 time slots (32–3) remain to be used for voice/voice-band data, assuming there are no other clear pass-through 64 kb/s channels preassigned. Assuming 120 active voice channels, the ADPCM compression required is from 8 bits to 1.87 bits (28*8/120). With DSI providing additional bandwidth gain, the ADPCM compression can provide a speech quality of 24 kb/s ADPCM for all channels.

The signaling information in common channel signaling is passed unaltered over the compressed E1. The time slots carrying common channel signaling, typically time slot 16, from UE1_A to UE1_D are mapped to predetermined time slots, TS_a through TS_d, in compressed E1. If not all four uncompressed E1s are required to pass through common channel signaling, then the system configuration would allow only specified uncompressed E1s to pass through signaling. For instance, if only UE1_D is to pass the common channel signaling, then TS_d on compressed E1 carries the signaling information and TS_a thru TS_c are available for voice/data traffic. Accordingly, TS2–TS30 may be available to be allocated to voice/data traffic in a dynamic or preassigned manner as configured through the control software. Any unused TS_a, TS_b, TS_c, TS_d may be used for dynamic allocation to voice/data channels.

In the worse case, if all the above fixed bandwidth is required, it leaves 25 time slots (32–7) to be used for voice/voice-band data, assuming there are no other preassigned clear pass-through 64 k b/s channels preassigned. The number of time slots available in the compressed E1 for voice/voice-band data is directly reduced by the number of pre-assigned pass-through (64 kb/s) channels.

Transcoder 12 may use a combination of ADPCM and DSI techniques to compress the incoming speech and/or data channels in uncompressed E1. An 8-bit PCM coded sample is compressed to 5, 4, 3, or 2 bits resulting in 40, 32, 24, or 16 kb ADPCM stream, respectively. Any frame that contains any voice energy is not used in the DSI application, so that voice transmission is not subject to clipping that is sometimes found in pure DSI applications.

Fractional E1 applications are supported by transcoder 12 of the present invention. The bandwidth available on the compressed E1 may be set via an "Available BW" parameter, an example is given below:

1. 32—>use all (0–31) 64 kb channels; this is the default setting;
2. 24—>use only 0–23 64 kb channels; and
3. 16—>use only 0–15 64 kb channels.

"Available BW" parameter can be any value 4 through 32. When the "Available BW" parameter is less than 32, then any unused channels of the compressed E1 may be filled with a predefined pattern.

After all the bandwidth for fixed and pre-assigned channels has been allocated, the remaining bandwidth is automatically assigned in the best possible manner to the incoming channels, depending on traffic conditions. As discussed above, it is further possible to limit the available bandwidth for dynamic allocation to support fractional E1 applications. The total bandwidth available on the compressed E1 link can be defined as 16, 24, or 32 (default) channels of 64 kb bandwidth. In a fractional case, the last of the channels of the available bandwidth may carry the $Sa_{5-8}$ overhead from all uncompressed E1s, if the system is so configured.

The voice/data (V/D) channels contain the bandwidth that can be dynamically assigned to incoming channels automatically or pre-assigned to certain incoming channels manually. In certain applications, such as high speed data rates greater than 56 kb, it may be necessary to pre-assign dedicated 64 kb channels. Each of these assignments uses up the 8-bit word and is not subject to DSI. The table below is an exemplary bandwidth allocation scheme for compressed E1. A, B . . . are eight-bit patterns conveyed in the PCL indicative of bandwidth allocation configuration.

Bandwidth Allocation for Compressed E1

| Control Configuration (PCL) | Av · BW | Signaling Option | Pass OVHD | TS_a | TS_b | TS_c | TS_d | Other Time Slots |
|---|---|---|---|---|---|---|---|---|
| A | 32 | CAS:ab | NO | 32 Fr CAS | V/D | V/D | V/D | V/D |
| B | 32 | CAS:ab | YES | 32 Fr CAS | V/D | V/D | V/D | V/D; TS31: OVHD |
| C | 32 | CAS:abcd | NO | 64 Fr CAS | V/D | V/D | V/D | V/D |
| D | 32 | CAS:abcd | YES | 64 Fr CAS | V/D | V/D | V/D | V/D; TS31: OVHD |
| E | 32 | CCS:ALL | NO | CCS-A | CC S-B | CC S-C | CCS-D | V/D |
| F | 32 | CCS:ALL | YES | CCS-A | CC S-B | CC S-C | CCS-D | V/D; TS31: OVHD |
| G | 24 | CAS:ab | NO | 32 Fr CAS | V/D | V/D | V/D | to TS23: V/D |
| H | 24 | CAS:ab | YES | 32 Fr CAS | V/D | V/D | V/D | V/D; TS23: OVHD |
| I | 24 | CAS:abcd | NO | 64 Fr CAS | V/D | V/D | V/D | to TS23: V/D |
| J | 24 | CAS:abcd | YES | 64 Fr CAS | V/D | V/D | V/D | V/D; TS23: OVHD |
| K | 24 | CCS:ALL | NO | CCS-A | CC S-B | CC S-C | CCS-D | up to TS23: V/D |
| L | 24 | CCS:ALL | YES | CCS-A | CC S-B | CC S-C | CCS-D | V/D; TS23: OVHD |
| M | 16 | CAS:ab | NO | 32 Fr CAS | V/D | V/D | V/D | up to TS15: V/D |
| N | 16 | CAS:ab | YES | 32 Fr CAS | V/D | V/D | V/D | V/D; TS15: OVHD |
| O | 16 | CAS:abcd | NO | 64 Fr CAS | V/D | V/D | V/D | up to TS15: OVHD |
| P | 16 | CAS:abcd | YES | 64 Fr CAS | V/D | V/D | V/D | V/D; TS15: OVHD |
| Q | 16 | CCS:ALL | NO | CCS-A | CC S-B | CC S-C | CCS-D | up to TS15: V/D |
| R | 16 | CCS:ALL | YES | CCS-A | CC S-B | CC S-C | CCS-D | V/D; TS15: OVHD |
| S | 32 | NONE | NO | V/D | V/D | V/D | V/D | up to TS31: V/D |
| T | 32 | NONE | YES | V/D | V/D | V/D | V/D | V/D; TS31: OVHD |
| U | 24 | NONE | NO | V/D | V/D | V/D | V/D | up to TS23: V/D |
| V | 24 | NONE | YES | V/D | V/D | V/D | V/D | V/D; TS23: OVHD |
| W | 16 | NONE | NO | V/D | V/D | V/D | V/D | up to TS15: V/D |
| X | 16 | NONE | YES | V/D | V/D | V/D | V/D | V/D; TS15: OVHD |

Accordingly, depending on the bandwidth configuration, there are between 30 and 25 channels available for voice/data communication between the two transcoders. These channels provide a contiguous bandwidth for allocation to the incoming calls. The maximum allowable data calls can be set up by the user via the "DATA" parameters. These data calls are automatically allocated 40 kb or 64 kb bandwidths as decided by the call parameters, such as data rate, which are automatically detected by the resident hardware on the uncompressed digroup circuit 92 (FIG. 3). Once a specific bandwidth has been allocated to the data call, it stays fixed for the duration of the call. All voice calls and any data calls over the maximum allowed are compressed with DSI application into the remaining bandwidth.

In certain applications, certain channels can be blocked to normal traffic. This feature may be useful when some of the common channel signaling channels are to be passed through. For example, if only UE1_A needs its associated signaling passed through and the other common channel signaling channels associated with UE1_B through UE1_D are to be blocked, then a "NONE" signaling option may be selected and the common channel signaling channels are assigned clear channel on the compressed E1. Clear (64 kb) or zero (0 kb) bandwidth may be pre-assigned to any one of the incoming 124 channels.

Controller 134 (FIG. 3) firmware in remote transcoder 40 may be updated through the compressed E1 link using predetermined bits of the PCL. For example, the bits devoted to data link bits ($Sa_4$) may be temporarily used for the software download. Download may be initiated through controller 134 software and controlled and monitored at the remote unit through the PDL.

Voice, voice-band data, and high speed data channels are supported with the maximum number of data channels being determined by the customer via a "DATA" parameter. All data channels are automatically assigned a specific bandwidth based on their data rates and are not subject to DSI. However, once the data channels (high speed and dial-up) equal the "DATA" parameter, additional data channels may be subject to the same compression as voice channels.

Comprehensive traffic statistics for all channels that have the bandwidth allocated dynamically are provided. The statistical computations and updates are performed on a periodic basis. Local or remote terminals coupled to transcoder 12 may display the computed statistics at set intervals. A statistics history for a predetermined number of days may be kept in a memory of controller 134. Statistics may be monitored and computed for channel activity, bit rate, blocking, and voice/data with data rate breakdown.

For proper operation, the information transfer between local and remote transcoders 12 and 40 (FIG. 1) must be properly synchronized. A MASTER/SLAVE synchronization strategy specifies that one unit is MASTER and the other side unit is SLAVE, where the SLAVE extracts timing from the received compressed E1. The MASTER can extract timing from any one of the given sources, including external and internal reference clock signals. The transmit of the compressed E1 is thus derived from the system clock, and the transmit of the uncompressed E1 can either be derived from a system clock or the option of loop timing is available. Daisy-chained co-located transcoders may derive synchronization from one single source by using SYNC_IN and SYNC_OUT (FIG. 2).

It may be seen that although the transcoder and the compressed E1 of the present invention have been described as having a four-to-one (4:1) compression ratio, the present invention is not so limited. A compression ratio of N:1, where N is greater than 1, may be achievable without undue experimentation. The compression ratio may be selected based on available bandwidth and implementation applicability and practicability.

Although the present invention and its advantages have been described in detail, it should be understood that various changes, substitutions and alterations can be made therein without departing from the spirit and scope of the invention as defined by the appended claims.

What is claimed is:

1. An N:1 E1 transcoder comprising:
   a compression data path including:
   an uncompressed digroup circuit receiving N incoming uncompressed E1 signals and extracting a plurality of control, signaling, and speech, voice-band data and digital data traffic channels therefrom;
   a compressor coupled to said uncompressed digroup circuit and compressing data in selected ones of said extracted speech, voice-band data and digital data channels;
   a compressed data circuit coupled to said compressor packing said compressed data into predetermined time slots of one compressed E1 signal, and further providing control, signaling, and performance monitoring information embedded therein;
   said compressed data circuit including:
   a packer for dynamically packing said compressed data into available time slots in the compressed E1 signal; and
   a proprietary communications link generator coupled to said packer generating control and overhead data for the compressed E1 signal including a proprietary data link having signaling information, software download control and status, operational control, alarm and status of the transcoder, said control and overhead data further including channel bandwidth information, idle noise parameters, data link bits, and remote alarm indicator, said packer embedding said control and overhead data into a proprietary communications link occupying at least one predetermined time slot of said compressed E1 signal.

2. The N:1 E1 transcoder, as set forth in claim 1, further comprising an uncompressed signal input circuit coupled to said uncompressed digroup circuit for receiving said N incoming uncompressed E1 signals and passing said received N incoming uncompressed E1 signals to said uncompressed digroup circuit.

3. The N:1 E1 transcoder, as set forth in claim 1, further comprising a compressed output circuit coupled to said compressed data circuit for transmitting said compressed E1 signal to a remote N:1 E1 transcoder.

4. The N:1 E1 transcoder, as set forth in claim 1, wherein said uncompressed digroup circuit comprises an echo canceler for providing echo canceling for speech channels.

5. The N:1 E1 transcoder, as set forth in claim 1, wherein said uncompressed digroup circuit comprises a digital speech interpolator for providing digital speech interpolation for said speech channels.

6. The N:1 E1 transcoder, as set forth in claim 1, wherein said uncompressed digroup circuit comprises a voice/data discriminator for differentiating speech or voice-band data on each uncompressed E1 channel.

7. The N:1 E1 transcoder, as set forth in claim 1, wherein said uncompressed digroup circuit comprises a voice/data discriminator for differentiating voice or voice-band data calls on each uncompressed E1 channel, and further detecting high-speed voice-band data channels.

8. The N:1 E1 transcoder, as set forth in claim 7, wherein said compressor includes a compression circuit for compressing only speech and low-speed voice-band data channels in response to said voice/data discriminator differentiation and detection.

9. The N:1 E1 transcoder, as set forth in claim 8, wherein said compressor comprises an ADPCM compression circuit for compressing data on said speech and low-speed voice-band data channels.

10. The N:1 E1 transcoder, as set forth in claim 9, wherein said ADPCM compression circuit compresses said speech and low-speed voice-band data at a highest possible rate given available bandwidth in the compressed E1 signal.

11. The N:1 E1 transcoder, as set forth in claim 1, wherein said compressed data circuit includes a signaling generator coupled to said packer generating signaling information, said packer further embedding said signaling information in at least one predetermined time slot of said compressed E1 signal.

12. The N:1 E1 transcoder, as set forth in claim 1, wherein said compressed data circuit includes an overhead generator generating and embedding overhead information in at least one predetermined time slot of said compressed E1 signal.

13. The N:1 E1 transcoder, as set forth in claim 1, wherein said compressed data circuit packs said compressed data into a predetermined number of time slots less than total available number of time slots in said compressed E1 signal.

14. The N:1 E1 transcoder, as set forth in claim 1, wherein said compressed data circuit packs selected channels of uncompressed E1 signal into predetermined pre-assigned time slots of the compressed E1 signal.

15. The N:1 E1 transcoder, as set forth in claim 1, wherein said compressed data circuit packs signaling information in predetermined time slots of said compressed E1 signal.

16. The N:1 E1 transcoder, as set forth in claim 1, further comprising N+1 uncompressed digroup circuits, each receiving one incoming uncompressed E1 signal, one of which being a redundant standby uncompressed digroup circuit.

17. The N:1 E1 transcoder, as set forth in claim 1, further comprising at least one redundant standby compressor.

18. The N:1 E1 transcoder, as set forth in claim 1, further comprising at least one redundant standby compressed data circuit.

19. The N:1 E1 transcoder, as set forth in claim 1, further comprising a power supply and at least one backup power supply.

20. The N:1 E1 transcoder, as set forth in claim 1, further comprising a fail-safe bypass switch selectively routing one incoming uncompressed E1 signal to a compressed E1 signal output during predetermined failure modes.

21. The N:1 E1 transcoder, as set forth in claim 1, further comprising at least one redundant compressed E1 signal output.

22. The N:1 E1 transcoder, as set forth in claim 1, further comprising a data expansion path including:

a second compressed data circuit receiving one incoming compressed E1 data signal having a plurality of time slots, said second compressed data circuit unpacking said plurality of time slots;

an expansion circuit coupled to said second compressed data circuit for expanding said compressed data in said time slots into uncompressed data; and a second uncompressed digroup circuit composing said uncompressed data into N uncompressed E1 data signals, and further providing control, signaling, and performance monitoring information therein.

23. The N:1 E1 transcoder, as set forth in claim 22, wherein said second compressed data circuit includes an unpacker for unpacking said plurality of time slots in said compressed E1 data signal.

24. The N:1 E1 transcoder, as set forth in claim 23, wherein said second compressed data circuit includes a signaling processor coupled to said unpacker for extracting and processing signaling information from said unpacked time slots.

25. The N:1 E1 transcoder, as set forth in claim 23, wherein said second compressed data circuit includes a proprietary communications link processor coupled to said unpacker for extracting and processing control and alarm data from said unpacked time slots.

26. The N:1 E1 transcoder, as set forth in claim 23, wherein said second compressed data circuit includes an overhead processor coupled to said unpacker for extracting and processing overhead information from said unpacked time slots.

27. The N:1 E1 transcoder, as set forth in claim 23, wherein said second uncompressed digroup circuit includes a digital speech interpolation processor for restoring noise parameters to speech data.

28. The N:1 E1 transcoder, as set forth in claim 22, wherein said expansion circuit includes an ADPCM expansion circuit for restoring ADPCM compressed voice data.

29. The N:1 E1 transcoder, as set forth in claim 22, wherein said second uncompressed digroup circuit further includes a framer receiving said decompressed data and grouping them into N uncompressed E1 data signals.

30. The N:1 E1 transcoder, as set forth in claim 1, further comprising a link for coupling and synchronizing with at least one additional co-located transcoder.

31. The N:1 E1 transcoder, as set forth in claim 1, further comprising a co-located terminal coupled thereto for entering control parameters and monitoring the transcoder.

32. The N:1 E1 transcoder, as set forth in claim 1, further comprising a co-located terminal coupled thereto for entering control parameters and monitoring all co-located transcoders daisy-chained with the transcoder.

33. The N:1 E1 transcoder, as set forth in claim 1, further comprising a co-located terminal coupled thereto for entering control parameters and monitoring at least one remote transcoder in communication with the transcoder via said compressed signals.

34. The N:1 E1 transcoder, as set forth in claim 1, further comprising a remote terminal linked thereto for entering control parameters and monitoring the transcoder and a remote transcoder coupled to the transcoder.

35. The N:1 E1 transcoder, as set forth in claim 1, wherein said uncompressed signal is an E1 signal transmitted at 2.048 Mb/s.

36. The N:1 E1 transcoder, as set forth in claim 1, wherein said compressed signal is an E1 signal transmitted at 2.048 Mb/s having 32 time slots, where each time slots is transmitted at 64 kb/s.

37. The N:1 E1 transcoder, as set forth in claim 1, further comprising a manual control input for receiving user's control and configuration parameters.

38. The N:1 E1 transcoder, as set forth in claim 1, further comprising a network management system input for providing control and configuration parameters.

39. The N:1 E1 transcoder, as set forth in claim 1, further comprising an N*64 kb/s add/drop link between the local and remote transcoders.

\* \* \* \* \*